May 9, 1933.  F. C. FRANK  1,908,415

BRAKE

Filed Aug. 6, 1931

INVENTOR.
FREDERICK C. FRANK
BY
ATTORNEYS.

Patented May 9, 1933

1,908,415

UNITED STATES PATENT OFFICE

FREDERICK C. FRANK, OF SOUTH BEND, INDIANA, ASSIGNOR TO BENDIX BRAKE COMPANY, OF SOUTH BEND, INDIANA, A CORPORATION OF ILLINOIS

BRAKE

Application filed August 6, 1931. Serial No. 555,486.

This invention relates to brakes and more particularly to internal expanding brakes.

In the illustrated embodiment of the invention the friction element of the brake includes an anchored shoe and a shoe pivotally and adjustably connected to the anchored shoe, and operating means for the friction element including a cylinder, a piston movable therein, a lever operated by the piston for actuating the friction element and means for locking the lever against movement.

The present invention is embraced in the operating lever and means associated therewith for locking the lever against movement.

An object of the invention is to provide a simple and inexpensive means for locking a brake in applied position.

An important object of the invention is to provide means for locking a brake in applied position including means engaging the operating lever of the brake.

Another important object of the invention is to provide a brake having a friction element, and operating means therefor including a locking member carried on the operating means and a fixed locking member associated therewith together with means for engaging the members.

Another object of the invention is to provide a brake having an operating member and means for locking the member against movement. The structure and arrangement requiring but few parts on which the amount of the machine operation during manufacture shall be materially reduced.

Other objects of the invention will appear from the following description taken in connection with the drawing, forming a part of this specification, and in which.

Figure 1:
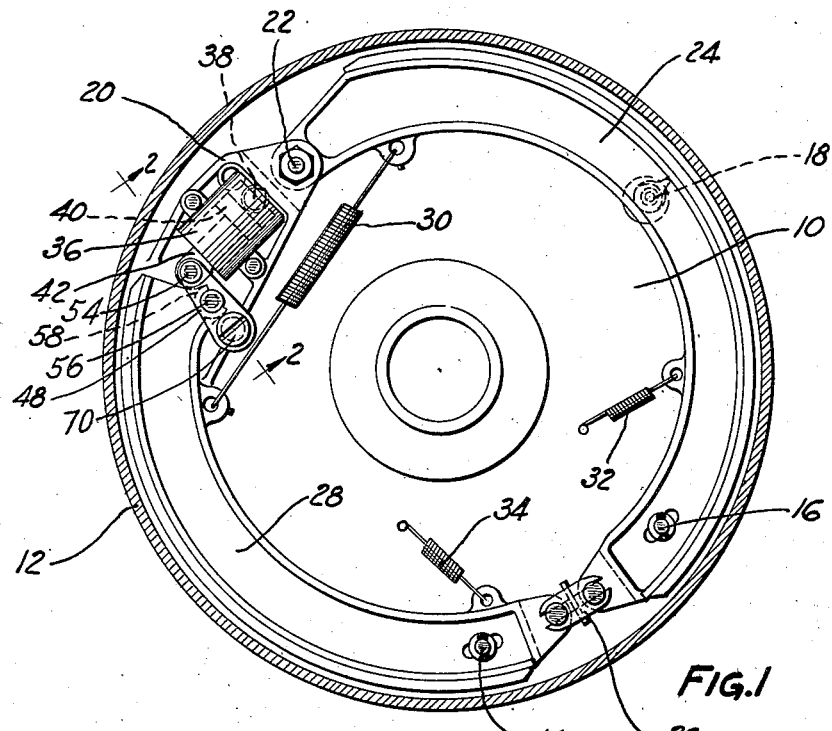
Figure 1 is a vertical sectional view of the brake taken just back of the head of the drum illustrating the friction element in side elevation and showing the invention as applied.

Referring to the drawing for more specific details of the invention, 10 represents a fixed support such as a backing plate. Associated with the backing plate is a rotatable drum 12 which may be secured to a wheel, not shown, and arranged on the backing plate are steady rests 14 and 16 and a suitable adjusting device such as an eccentric 18.

The backing plate 10 has positioned thereon a bracket 20 supporting the fixed anchor 22 to which is pivotally connected a shoe 24 having adjustably connected thereto as by an adjusting device 26 a servo shoe 28.

The shoes 24 and 28 are connected by a return spring 30, the shoe 24 is connected by a return spring 32 to the fixed support and the shoe 28 is connected by a return spring 34 to the fixed support. These springs serve to return and retain the shoes in the off position against the adjustable stop or eccentric 18, in spaced relation to the drum.

Supported on the bracket 20 is a cylinder 36 having a port 38 for the admission of fluid under pressure. The cylinder 36 has positioned therein for movement a piston 40 provided with the conventional rod 42. Positioned on the backing plate 10 is a boss 44 bored and threaded to receive a sleeve 46. This sleeve constitutes a fixed pivot on which is fulcrumed an operating lever 48. As shown, the lever 48 comprises two parallel plates or members 50 having one end pivoted on the sleeve 46 with a suitable spacer 52 between the plates. The other ends of the plates 50 are connected by a pivot 54 to the piston rod 42 and positioned between the plates 50 is a roller 56 engaging a notch 58 in the force applying end of the servo shoe 28.

The boss 44 has pinned or otherwise secured thereto a washer 60 provided with a toothed or serrated face 62. A corresponding washer 64 is slipped over the fixed pivot 46 and is pinned or otherwise secured to the pivotal end of the lever 48. This washer is provided with a toothed or serrated face 66 adaptable for engagement with the serrated face 62 on the washer 60. The washers 60 and 62 are normally held disengaged by a spring 68 coiled on the washers 60 and 64 between the boss 44 and the lever 48.

Figures 2, 3:
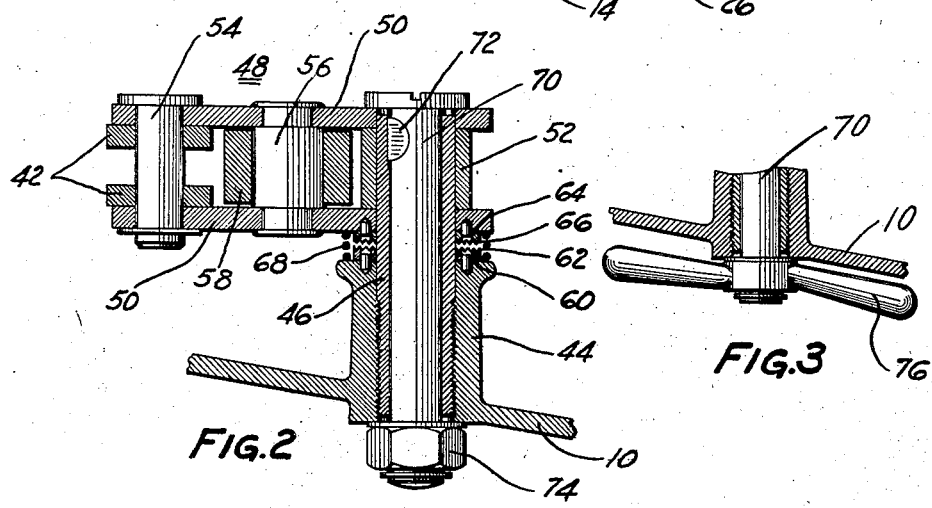
Figure 2 is a sectional view substantially on line 2—2 of Figure 1.
Figure 3 is a modification of the locking means.

Positioned in the hollow pivot 46 is a bolt 70 suitably keyed to the pivot 46 as indicated at 72. The bolt extends through the hollow pivot 46 and the backing plate 10 and is provided with a nut 74 or with a thumb nut 76 such as shown in Figure 3. By tightening up on the nut 74 the serrated faces on the washers 62 and 66 are caused to engage one another and when in this position the lever 48 is locked against angular movement.

Normally the brake is operated by hydraulic controlled methods and the locking means herein described is not brought into use except in instances where the plane is not in use. When the plane is parked the operator, upon leaving the plane, rotates the nut 74 or thumb nut 76 as the case may be to engage the lock washers 60 and 64. This prevents the lever from moving and effectively locks the brakes and retains them in a locked position until purposely released by the operator.

It is particularly desirable that some means be provided for locking the brakes of an airplane brake in instances where the plane is equipped with a hydraulically operated means, since the temperature of the hydraulic fluid used may vary to such an extent after the landing of the plane and particularly after it has stood a while that the hydraulic controlled brakes will automatically release themselves due to the contraction of the hydraulic fluid.

Although this invention has been described in connection with certain specific embodiments the principles involved are susceptible of numerous other applications that will readily occur to persons skilled in the art. The invention is, therefore, to be limited only as indicated by the scope of the appended claims.

Having thus described my invention what I claim as new and desire to secure by Letters Patent is:

1. A brake comprising a friction element, an operating lever therefor, a lock washer keyed to the lever, a stationary lock washer adaptable for cooperation therewith and means for engaging the lock washers.

2. A brake comprising a friction element, an operating lever therefor, a lock washer carried by the lever, a stationary lock washer cooperating with the washer on the lever, means normally retaining the lock washers disengaged and means for engaging the lock washers.

3. A brake comprising a fixed support, a drum associated therewith, a friction element on the support for cooperation with the drum, an operating member for the friction element, a hollow pivot for the operating member, a locking member carried by the operating member, a fixed locking member cooperating therewith and means extending through the hollow pivot for clamping the locking members together.

4. A brake comprising, in combination with a drum and a backing plate at the open side of the drum, friction means within the drum, a lever arranged within the drum and pivotally mounted on the backing plate, a fluid-pressure applying device within the drum arranged to operate the lever to apply the friction means, and means operable from outside the backing plate for locking the lever to hold the brake applied independently of said applying device.

5. A brake comprising, in combination with a drum and a backing plate at the open side of the drum, friction means within the drum, an operating device arranged within the drum and mounted on the backing plate, a fluid-pressure applying device within the drum arranged to operate the operating device to apply the friction means, and means operable from outside the backing plate for actuating the operating device to hold the brake applied independently of said applying device.

6. A brake comprising, in combination with a drum and a backing plate at the open side of the drum, friction means within the drum, an operating device arranged within the drum and mounted on the backing plate, an applying device within the drum arranged to operate the operating device to apply the friction means, and means operable from outside the backing plate for actuating the operating device to hold the brake applied independently of said applying device.

7. A brake comprising, in combination with a drum and a backing plate at the open side of the drum, friction means within the drum, an operating device arranged within the drum and mounted on the backing plate, a fluid-pressure applying device within the drum arranged to operate the operating device to apply the friction means, and means for locking said operating device against movement.

8. A brake comprising friction means having a movable part, a lever having intermediate thrust engagement with said part, applying means acting on one end of the lever to rock the lever to apply the friction means, and a pivot for the other end of the lever which is operable independently of the applying means to hold the lever with the friction means applied.

9. A brake comprising friction means having a movable part, a lever having intermediate thrust engagement with said part, applying means acting on one end of the lever to rock the lever to apply the friction means, and a pivot for the other end of the lever having locking means operable to hold it against movement.

10. A brake-applying device comprising an axially-shiftable pivot having a lever mounted thereon and having on one side a clutch member, and a fixed clutch member into engagement with which the first clutch member is shifted by axial movement of the pivot.

11. A device of the class described comprising a boss having a sleeve mounted therein, a clutch member mounted on the sleeve and seated against the boss and held from movement by the boss, an operating device axially slidable on the sleeve and having on one side a clutch member engageable with the first clutch member, a spring urging the two clutch members apart, and a bolt in the sleeve having a part engaging the operating device and which bolt is operable to draw the two clutch members together.

In testimony whereof, I have hereunto signed my name.

FREDERICK C. FRANK.